Patented Sept. 5, 1950

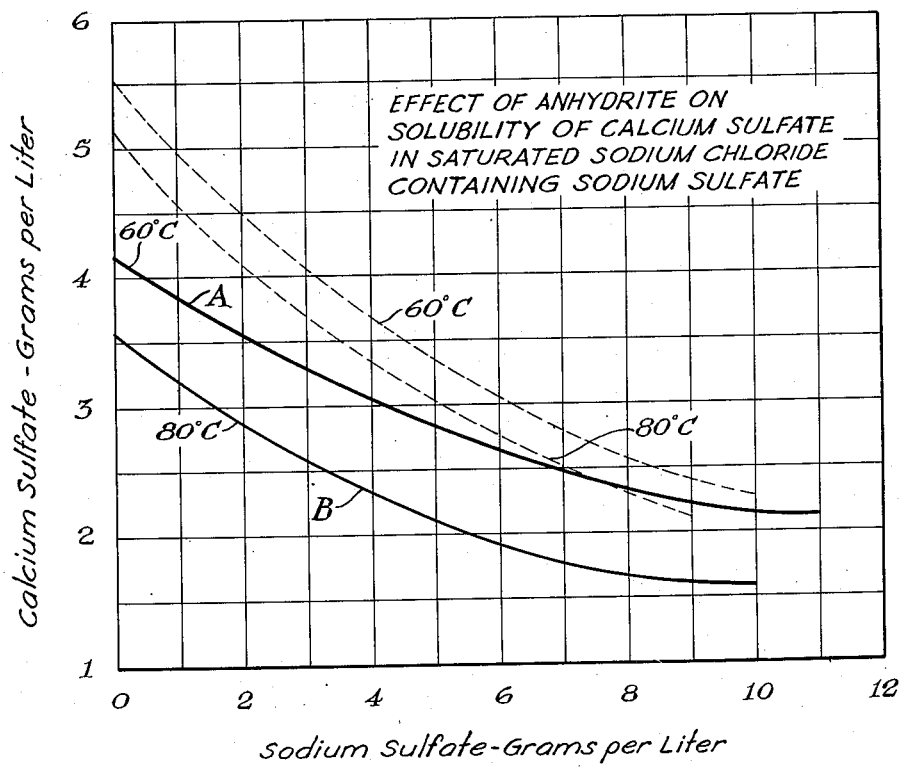

2,521,459

UNITED STATES PATENT OFFICE 2,521,459

PREPARING SODIUM CHLORIDE BRINE

Ralph M. Hunter, Robert D. Blue, and Marshall P. Neipert, Midland, Mich., assignors to The Dow Chemical Company, Midland, Mich., a corporation of Delaware Application February 3, 1949, Serial No. 74,272

8 Claims. (Cl. 23—89)

This invention relates to an improved method for preparing strong sodium chloride brines low in calcium sulfate impurity from crude sodium chloride containing gypsum ($CaSO_4 \cdot 2H_2O$).

For a number of its uses, sodium chloride brine must be nearly free of the calcium sulfate impurity normally present in most salt. This requirement is important in the regeneration of zeolite water-softeners, in the manufacture of dyes, and in the mercury-cell electrolytic production of chlorine and caustic soda. The problems in the latter field, and one method of overcoming them, are set forth in our copending application Serial No. 61,822 filed November 24, 1948. As there explained, hydrogen impurity in the evolved chlorine can best be held to a low concentration by limiting the proportion of calcium sulfate in the saturated sodium chloride feed brine to less than 4 grams per liter.

While the method of minimizing calcium sulfate solubility described in the said application is effective, the present invention provides for a further significant reduction of calcium sulfate impurity in strong sodium chloride brines. The reduction is realized by maintaining particles of anhydrite ($CaSO_4$) in the brine during the time it is being saturated by contact with the raw sodium chloride.

In the presence of the anhydrite, there is established an equilibrium between this crystalline solid and such calcium sulfate as tends to dissolve in the brine from the gypsum present in the raw salt. At the equilibrium, the concentration of dissolved calcium sulfate is materially less than that corresponding to the solubility limit of gypsum in the brine observed in the absence of anhydrite.

It has also been found that the equilibrium concentration of calcium sulfate dissolving in brine in the presence of solid anhydrite can be repressed markedly by maintaining sodium sulfate dissolved in the brine while it is in contact with the raw sodium chloride. By taking advantage of both these findings, it is easily possible to produce from gypsiferous salt saturated brines containing less than 3 grams per liter of calcium sulfate. Concentrations below 2 grams per liter can be obtained with careful control of the process.

The invention may be explained with reference to the accompanying drawing which is a graph showing at several temperatures the solubility limit of calcium sulfate in saturated solutions of sodium chloride containing various proportions of sodium sulfate, curves being given for the presence and the absence of anhydrite crystals.

In practicing the invention in its simplest form, the aqueous medium in which sodium chloride is to be dissolved is passed into contact with the crude solid sodium chloride containing gypsum, and particles of anhydrite are maintained in the brine during such contact. The proportion of anhydrite appears not to be critical, as long as there is a sufficient amount to insure that solid-phase anhydrite is present at all times. Ordinarily, not over 3 to 4 grams of anhydrite are required per liter of solution in contact with the sodium chloride, even when the brine to be saturated is initially free of calcium sulfate, which is rarely if ever the case. There is a more rapid attainment of equilibrium conditions if the anhydrite is in the form of fine particles and the medium is agitated to maintain the anhydrite suspended throughout.

The effect of anhydrite according to the invention is realized at all temperatures above the phase transition temperature of gypsum to anhydrite in the presence of sodium chloride brine. This latter temperature is dependent on the concentration of the brine but seems to be about 25° to 30° C. for saturated brine, and not over 42° C., even for weak brines. Since the rate at which equilibrium is attained is also a function of temperature, it is most satisfactory to operate above 40° C. even in resaturating brines which are initially nearly saturated, with temperatures above 50° C. being preferred in most cases.

The time required for attainment of the phase equilibrium resulting in minimum concentration of calcium sulfate in the brine is in any case comparatively long. Thus, even at temperatures of 80° C. and above, where the rate is most rapid, the anhydrite-containing brine should remain in contact with the gypsiferous sodium chloride for at least a day or two. At temperatures of 40° to 60° C. longer times, preferably sixty days or more, give best results.

The anhydrite employed need not be pure, but may be obtained from any desired source. Naturally occurring anhydrite, preferably ground to a particle size less than 0.1 inch, is entirely satisfactory. In a continuous process for resaturating brine, the anhydrite is conveniently added continuously to the brine as it is being passed into contact with the solid sodium chloride. The manner of introducing the anhydrite is not critical, and need not be continuous, since it is necessary only that solid anhydrite be present in the contact zone at all times.

As already mentioned, in the process of the invention the concentration of calcium sulfate in the final brine may be further reduced by maintaining sodium sulfate dissolved in the anhydrite-containing brine during its contact with the solid sodium chloride. While any proportion of sodium sulfate is helpful, it is desirable to use enough to repress the solubility of calcium sulfate to below 4 grams per liter and preferably to below 3 grams per liter. To this end, 2 to 6 grams per liter of sodium sulfate is ordinarily sufficient. For some purposes, higher concentrations may be used to produce still greater repression of calcium sulfate solubility. On the other hand, when the final brine is to be employed as electrolytic cell feed, sodium sulfate concentrations corresponding to a total sulfate ion concentration of more than 10 grams per liter should be avoided because of adverse effects on cell operation.

The effect of sodium sulfate in decreasing the solubility of calcium sulfate (derived from gypsum) in saturated sodium chloride brine at temperatures of 60° and 80° C. is given quantitatively in the drawing. The data there presented are largely new to the literature. The upper two curves show the solubility in the absence of solid anhydrite, and are given only for comparison with the lower two which give the solubilities in the presence of anhydrite crystals, according to the invention. Curve A illustrates the equilibrium solubilities observed at 60° C. after 98 days of contact with gypsiferous sodium chloride. Curve B is at 80° C. after 10 days.

In view of the long contact times required in the invention, the process is most suitable as a part of the known method of resaturating salt brines by pumping them through natural underground solid salt deposits. To this end, the brine is pumped continuously through the deposit at a rate corresponding to a contact time of at least 60 days, being introduced through a well leading into the salt formation and withdrawn through a second well at a point remote in the deposit from the first.

We claim:

1. In a process of making strong sodium chloride brine wherein an aqueous medium is passed into contact with solid sodium chloride containing calcium sulfate in the form of gypsum, the method of producing brine containing calcium sulfate in a concentration materially less than that corresponding to the solubility limit of gypsum which comprises maintaining particles of anhydrite in the brine throughout such contact while maintaining the brine at a temperature above the phase transition temperature of gypsum to anhydrite in the presence of sodium chloride.

2. A method according to claim 1 wherein sodium sulfate is also maintained dissolved in the brine in a concentration sufficient to repress the solubility of calcium sulfate to below 4 grams per liter, such sodium sulfate concentration being of the order of 2 to 6 grams per liter.

3. A process according to claim 2 wherein the brine is maintained at a temperature of at least 50° C. during contact with the solid sodium chloride.

4. In a process wherein sodium chloride brine is resaturated at a temperature of at least 30° C. by contact with solid sodium chloride containing calcium sulfate in the form of gypsum, the method of producing a saturated brine containing calcium sulfate in a concentration materially less than that corresponding to the solubility limit of gypsum which comprises suspending particles of anhydrite in the brine in a proportion sufficient to maintain solid-phase anhydrite therein, passing the anhydrite-containing brine into contact with the sodium chloride and maintaining such contact for at least 60 days, and thereafter withdrawing the resaturated brine from the contact zone.

5. A method according to claim 4 wherein sodium sulfate is also maintained dissolved in the brine in a proportion sufficient to repress the solubility of calcium sulfate to below 3 grams per liter but insufficient to produce a total sulfate ion concentration over 10 grams per liter, such sodium sulfate concentration being of the order of 2 to 6 grams per liter.

6. In a process wherein sodium chloride brine is resaturated by passing it at a temperature of at least 30° C. through an underground solid sodium chloride deposit containing gypsum, the method of producing a saturated brine containing calcium sulfate in a concentration materially less than that corresponding to the solubility limit of gypsum which comprises suspending particles of anhydrite in the brine in a proportion sufficient to maintain solid-phase anhydrite therein, and pumping the anhydrite-containing brine into the deposit, maintaining it therein for a period of at least 60 days, and thereafter withdrawing saturated brine.

7. A process according to claim 6 wherein the brine is pumped continuously through the deposit at a rate corresponding to a contact time of at least 60 days, being introduced through a well and withdrawn through a second well at a point remote in the deposit from the first.

8. A process according to claim 7 wherein sodium sulfate is also maintained dissolved in the brine in a proportion sufficient to repress the solubility of calcium sulfate to below 3 grams per liter but insufficient to produce a total sulfate ion concentration over 10 grams per liter, such sodium sulfate concentration being of the order of 2 to 6 grams per liter.

RALPH M. HUNTER.
ROBERT D. BLUE.
MARSHALL P. NEIPERT.

REFERENCES CITED

The following references are of record in the file of this patent:

UNITED STATES PATENTS

| Number | Name | Date |
|---|---|---|
| 1,475,563 | Brooks | Nov. 27, 1923 |
| 1,776,595 | Nordengren | Sept. 23, 1930 |
| 1,937,995 | Thomsen | Dec. 5, 1933 |
| 2,108,783 | Smith | Feb. 15, 1938 |
| 2,191,411 | Pierce | Feb. 20, 1940 |

OTHER REFERENCES

J. W. Mellor's "A Comprehensive Treatise on Inorganic and Theoretical Chemistry": vol. 3, pp. 777–779, 785, 805, 806, and vol. 2, page 665; Longmans, Green & Co., New York.